United States Patent [19]

Asada

[11] Patent Number: 5,097,726
[45] Date of Patent: Mar. 24, 1992

[54] SHIFT CONTROL SYSTEM AND METHOD FOR AUTOMATIC TRANSMISSIONS

[75] Inventor: Toshiyuki Asada, Susono, Japan

[73] Assignee: Toyota Jidosha Kabushiki Kaisha, Toyota, Japan

[21] Appl. No.: 640,924

[22] Filed: Jan. 14, 1991

[30] Foreign Application Priority Data

Jan. 19, 1990 [JP] Japan .................. 2-10109

[51] Int. Cl.$^5$ .................. B60K 41/18; B60K 41/16
[52] U.S. Cl. .................. 74/866; 74/336 R; 74/339; 475/278; 475/153; 364/424.1
[58] Field of Search .......... 74/866, 336 R, 339; 475/278, 153; 364/424.1

[56] References Cited

U.S. PATENT DOCUMENTS

| | | | |
|---|---|---|---|
| 2,825,245 | 3/1958 | Hobbs | 475/278 |
| 3,043,163 | 7/1962 | Hobbs | 475/277 X |
| 3,115,793 | 12/1963 | Hobbs | 475/277 |
| 3,596,537 | 8/1971 | Koivunen | 192/85 AA X |
| 3,848,518 | 11/1974 | Martin | 192/85 AA X |
| 3,863,524 | 2/1975 | Mori et al. | 475/278 |
| 3,964,584 | 6/1976 | Bucksch | 192/87.11 |
| 4,225,026 | 9/1980 | Yamamori et al. | 192/85 AA |
| 4,233,861 | 11/1980 | Gaus et al. | 475/56 |
| 4,395,925 | 8/1983 | Gaus | 475/278 |
| 4,450,944 | 5/1984 | Fujioka | 192/85 AA X |
| 4,660,439 | 4/1987 | Hiraiwa | 475/276 |
| 4,790,418 | 12/1988 | Brown et al. | 74/336 R |
| 4,843,922 | 7/1989 | Kashihara | 74/866 |
| 4,868,753 | 9/1989 | Mori | 74/866 X |
| 4,963,124 | 10/1990 | Takahashi et al. | 475/278 |
| 4,967,355 | 10/1990 | Iwatsuki et al. | 74/866 X |
| 4,989,477 | 2/1991 | Hunter et al. | 74/336 R X |

FOREIGN PATENT DOCUMENTS

| | | | |
|---|---|---|---|
| 0378900 | 7/1990 | European Pat. Off. | 475/278 |
| 2108219 | 5/1983 | United Kingdom | 192/85 AA |

Primary Examiner—Rodney H. Bonck
Assistant Examiner—Daniel Wittels
Attorney, Agent, or Firm—Oblon, Spivak, McClelland, Maier & Neustadt

[57] ABSTRACT

A shift control system for an automatic transmission comprises: a gear train including a plurality of planetary gear sets having rotary components, an input shaft and an output shaft; a plurality of clutches for selectively connecting either the rotary components of the planetary gear sets with each other or the rotary components and the input shaft; and a plurality of brakes for holding the rotary components selectively in immovable states, any one of the planetary gear sets being adapted to take no part in the transmission of torque at one gear stage. The shift control system comprises: a shift judging device for judging that a shift is to be executed; a decision device for deciding that there is a planetary gear set which takes no part in the torque transmission at a gear stage to be set thereto as a result of executing the shift; a detection device for detecting the rotational speed of the rotary components of the planetary gear set which takes no part in the torque transmission at the gear stage; and an engagement control device for controlling the engaged states of the clutches or the brakes on the basis of the detection result by the detection device so that the revolving states of the rotary components of the planetary gear set taking no part in the torque transmission may be controlled.

18 Claims, 5 Drawing Sheets

SHIFT CONTROL SYSTEM AND METHOD FOR AUTOMATIC TRANSMISSIONS

BACKGROUND OF THE INVENTION

1. Field of the Invention

The present invention relates to an automatic transmission having its gear train composed of a plurality of planetary gear sets and capable of changing the connection relations of the rotary components and, more particularly, to a shift control system for the automatic transmission, which is constructed to leave any of the planetary gear sets taking no part in the transmission of a power at a predetermined gear stage.

2. Description of the Related Art

As is well known, the gear train of an automatic transmission is composed of a plurality of planetary gear sets. This is partly because the planetary gear sets can be arrayed on line and made compact and partly because the meshing relations of the gears need not be changed to provide an excellent durability. The number of gear stages to be set by the automatic transmission of this kind naturally becomes larger for the larger number of the planetary gear sets used. In addition, however, the number of gear stages to be set can also be increased if the mutual connection relations of the rotary members—the sun gears, the ring gears and the carriers—of the planetary gear sets can be changed by clutch means. The automatic transmission having this structure is disclosed in Japanese Patent Laid-Open No. 60-57036, for example. We proposed in Japanese Patent Application No. Hei 1-185151 a gear shift mechanism for an automatic transmission, which uses planetary gear sets equal in number to that of Japanese Patent Laid-Open No. 60-57036 but has a larger number of gear stages to be set and can execute more various shift controls and improve the power performance.

One example of the system according to our proposal is shown in FIG. 6. First to third planetary gear sets 1, 2 and 3 are arrayed on a line between an input shaft 4 and an output shaft 5. Each of these planetary gear sets 1, 2 and 3 has its rotary components, the input shaft 4 and the output shaft 5 are connected in the following manner. The carrier 1C of the first planetary gear set 1 is integrally connected to the ring gear 3R of the third planetary gear set 3. The ring gear 2R of the second planetary gear set 2 is integrally connected to the carrier 3C of the third planetary gear set 3, which is connected to the output shaft 5. There are also provided three sets of clutch means for connecting the individual rotary components of the planetary gear sets 1, 2 and 3 selectively to each other. Specifically, these three sets of clutch means are: second clutch means K2 for selectively connecting the sun gear 1S of the first planetary gear set 1 and the carrier 2C of the second planetary gear set 2; fourth clutch means K4 for selectively connecting the sun gear 1S of the first planetary gear set 1 and the sun gear 2S of the second planetary gear set 2; and fifth clutch means K5 for selectively connecting the carrier 2C of the second planetary gear set 2 and the sun gear 3S of the third planetary gear set 3. Of these, the fourth clutch means K4 is composed of a one-way clutch 20 and a multiple disc clutch 22 which are in parallel relation to each other.

In addition to these clutch means, there are also provided two clutch means: first clutch means K1 for selectively connecting the input shaft 4 and the ring gear 1R of the first planetary gear set 1; and third clutch means K3 for selectively connecting the input shaft 4 and the sun gear 1S of the first planetary gear set 1.

As the brake means, on the other hand, there are provided three sets of brake means: first brake means B1 for holding the sun gear 3S of the third planetary gear set 3 selectively in an immovable state; second brake means B2 for holding the carrier 2C of the second planetary gear set 2 selectively in an immovable state; and third brake means B3 for holding the sun gear 2S of the second planetary gear set 2 selectively in an immovable state. Of these: the first brake means B1 is composed of a one-way clutch 40 and a band brake 42 which are in parallel relation to each other; the second brake means B2 is composed of a one-way clutch 60 and a multiple disc clutch 61 which are in parallel relation to each other; and the third brake means B3 is composed of a band brake.

Incidentally, reference numeral 6 appearing in FIG. 6 designates a transmission casing (as will be shortly referred to as the "casing").

According to the system shown in FIG. 6, the connection relations between the rotary components of the individual planetary gear sets 1, 2 and 3 can be interchanged to set a number of gear stages. In addition, there are a plurality of kinds of engagement/release patterns for the clutch means and the brake means to set a predetermined one of the gear stages, as will be tabulated in the clutch and brake application chart of Table 1. Incidentally, in Table 1: symbols ○ indicate the engaged stage; blanks indicate the released state; and symbols * indicate that the corresponding means may be engaged. In addition, the means indicated by the symbol * for the fifth clutch means K5 or the first brake means B1 at the 1st speed stage have one of the following characteristics: (1) the gear ratio and the revolving state remain unchanged even when it is released, (2) the revolving state but not the gear ratio is changed when released, and (3) the gear ratio and the revolving state remain unchanged even when released, if another means indicated by the symbol * is engaged. In Table 1, moreover, the columns designated at a, b, c, - - -, and so on at the 2nd, 3rd, 4th and 5th speeds and in the reverse range indicate that the engagement/release pattern for setting the gear stage under consideration has a different rotational speed of the rotary components of the planetary gear sets. Still moreover, the numerals ①, ②, ③ - - -and so on indicate the kinds of the engagement/release patterns in which the rotational speeds of the rotary components of the planetary gear sets are not different.

TABLE 1

|  |  | Clutch Means |  |  |  |  | Brake Means |  |  |
|---|---|---|---|---|---|---|---|---|---|
|  |  | K1 | K2 | K3 | K4 | K5 | B1 | B2 | B3 |
| 1st |  | ① ○ |  |  | ○ | ○ | ○ | * |  |
|  |  | ② ○ |  |  | ○ | ○ | * | ○ |  |
|  |  | ③ ○ |  |  | ○ | * | ○ | ○ |  |
| 2nd | a | ① ○ | ○ |  | ○ | ○ | * |  |  |
|  |  | ② ○ | ○ |  | ○ | * | ○ |  |  |
|  |  | ③ ○ | ○ |  | * | ○ | ○ |  |  |
|  | b | ○ | ○ |  |  | ○ | ○ |  | ○ |
| 2.2th |  | ○ | ○ |  |  |  | ○ |  | ○ |
| 2.5th |  | ○ | ○ |  |  | ○ | ○ |  | ○ |
| 2.7th |  | ○ | ○ |  | ○ |  | ○ |  |  |
| 3rd | a | ① ○ |  | ○ |  | * | ○ | * |  |
|  |  | ② ○ |  | ○ |  | ○ | * | ○ |  |
|  | b | ○ |  | ○ |  |  | ○ |  | * |
|  | c | ○ |  | ○ | * |  | ○ |  |  |
|  | d | ○ | * | ○ |  |  | ○ |  |  |
| 3.2th |  | ○ | ○ |  |  | ○ |  |  | ○ |

TABLE 1-continued

| | | | K1 | K2 | K3 | K4 | K5 | B1 | B2 | B3 |
|---|---|---|---|---|---|---|---|---|---|---|
| 3.5th | | | ○ | | ○ | | ○ | | | ○ |
| 4th | a | ① | • | ○ | ○ | ○ | • | | | |
| | | ② | ○ | • | ○ | ○ | ○ | | | |
| | | ③ | ○ | ○ | • | ○ | ○ | | | |
| | | ④ | ○ | ○ | ○ | • | ○ | | | |
| | b | | ○ | • | ○ | ○ | ○ | • | | |
| 5th | a | | | • | ○ | ○ | ○ | • | | ○ |
| | b | | | ○ | ○ | ○ | • | | | ○ |
| | c | | | ○ | ○ | ○ | | • | • | |
| Rev | a | ① | • | | ○ | ○ | | • | • | ○ |
| | | ② | | • | ○ | ○ | ○ | ○ | • | ○ |
| | b | | | | ○ | ○ | | | | ○ |

Table 1 exemplifies the gear stages which can be set in principle. For practical use, one excellent in the power performance and the accelerability is selected from those gear stages. Specifically, a gear stage for providing a gear ratio having a relation approximate to the geometric series is selected as a major one, and one advantageous in the shift controllability and the durability is selected in Table 1 from the engagement/release patterns for setting the individual gear stages. In the structure shown in FIG. 6, on the other hand, the fourth clutch means K4, the first brake means B1 and the second brake means B2 use the one-way clutches 20, 40 and 60 in combination. In case, therefore, it is intended to block the revolution in the direction to release those one-way clutches 20, 40 and 60, the multiple disc clutch 22, the band brake 42 or the multiple disc clutch 61, all of which are in parallel relation to the former clutches, are engaged to bring their corresponding clutch means K4 and brake means B1 and B2 into their engaged states.

The setting of the gear stages in the system, as shown in FIG. 6, is executed while considering the power performance of the shift controllability, as has been described hereinbefore. For example, the 2nd speed is set according to the pattern of column b of Table 1, and the 3rd speed is set according to the pattern of column b or c. Considering the shift from the 3rd to 4th speed, the 3rd speed is set according to the pattern of column c. In this case, the 2nd speed is set by engaging the first clutch means K1, the fourth clutch means K4, the first brake means B1 and the third brake means B3. In the first planetary gear set 1, therefore, the ring gear 1R is rotated with the input shaft 4 with the sun gear 1S being held immovable. In the third planetary gear set 3, on the other hand, the sun gear 3S is held immovable, and the ring gear 3R is rotated at a speed which is decelerated from that of the revolutions of the input shaft 4 by the first planetary gear set 1. In the second planetary gear set 2, moreover, the sun gear 2S is held immovable, but the ring gear 2R is rotated together with the carrier 3C of the third planetary gear set 3. As a result, the individual rotary components of the planetary gear sets 1, 2 and 3 are mechanically caused to perform the specified motions by the closed chain. According to the pattern of column b or c of the 3rd speed, on the other hand, at least the first clutch means K1, the third clutch means K3 and the first brake means B1 are engaged. As a result, the first planetary gear set 1 has its sun gear 1S and ring gear 1R rotated together integrally with the input shaft 4 so that it is integrally rotated in its entirety. In the third planetary gear set 3, on the other hand, the ring gear 3R connected to the carrier 1C of the first planetary gear set 1 is rotated at the same speed as that of the input shaft 4 with the sun gear 3S being held immovable. As a result, the 3rd speed is set by the first planetary gear set 1 and the third planetary gear set 3 taking part in the transmission of the power, but the second planetary gear set takes no part. Unless the fourth clutch means K4 or the third brake means B3 is engaged, there is mechanically established the unconstrained chain, in which both the sun gear 2S and the carrier 2C are unconnected to other members including the casing 6. At the time of the shift from the 2nd to 3rd speeds, it is conceivable that the third brake means B3 is left engaged, namely, that the 3rd speed is set according to the pattern of column b. In case the 4th speed is to be set, the third brake means B3 has to be released, and the rotational speed of the sun gear 2S of the second planetary gear set 2, which has been held immovable by the third brake means B3, is increased to a value equal to that of the input shaft. In this case, the second planetary gear set 2 has to be brought into the unconstrained chain as the third brake means B3 is released. This likewise applies to the case in which the 3rd speed is to be set according to the pattern of column c so as to facilitate the shift from the 3rd speed to the 4th speed.

In connection with the planetary gear set thus brought into the unconstrained chain taking no part in the power transmission, the control of the revolving state of the rotary components of that planetary gear set can be executed by neither the control for setting the gear stages nor the control based upon the rotational speed of the input shaft 4 or the output shaft 5. Thus, the rotations may fluctuate highly or abruptly in accordance with the shift. As a result, shock accompanying the revolution fluctuations may possibly be felt as shift shocks when shifting into another speed stage in which the rotary components take part in power transmission.

SUMMARY OF THE INVENTION

It is, therefore, an object of the present invention to reduce the shift shocks by controlling the revolving state of that one of planetary gear sets constituting a gear train, which takes no part in the power transmission.

Another object of the present invention is to provide a control system for controlling the engaged state of the frictional engagement means on the basis of the revolving state of the rotary components of the planetary gear set taking no part in the torque transmission.

According to the present invention, there is provided a shift control system for an automatic transmission comprising: a gear train including a plurality of planetary gear sets having rotary components, an input shaft and an output shaft; a plurality of clutch means for selectivly connecting either the rotary components of said planetary gear sets with each other or said rotary components and said input shaft; and a plurality of brake means for holding said rotary components selectively in immovable states, any one of said planetary gear sets being adapted to take no part in the transmission of torque at one gear stage. The shift control system comprises: detection means for detecting the rotational speed of the rotary components of the planetary gear set which takes no part in the torque transmission at said gear stage; and engagement control means for controlling the engaged states of said clutch means or said brake means on the basis of the detection result by said detection means so that the revolving states of the rotary components of the planetary gear set taking no part in the torque transmission may be controlled.

According to the present invention, moreover, said clutch means and said brake means are adapted to be controlled with oil pressures fed thereto, and said shift control system further comprises hydraulic control means for controlling the oil pressures to be fed to said clutch means and said brake means.

According to the present invention, still moreover, there is also provided a shift control method for an automatic transmission comprising: a gear train including a plurality of planetary gear sets having rotary components, an input shaft and an output shaft; a plurality of clutch means for selectivly connecting either the rotary components of said planetary gear sets with each other or said rotary components and said input shaft; and a plurality of brake means for holding said rotary components selectivly in immovable states, any one of said planetary gear sets being adapted to take no part in the transmission of torque at one gear stage. The shift control method comprises a step of controlling the engaged states of said clutch means or said brake means so that the revolving states of the rotary components of the planetary gear set may take no part in the torque transmission may be controlled.

The above and further objects and novel features of the present invention will more fully appear from the following detailed description when the same is read in connection with the accompanying drawings. It is to be expressly understood, however, that the drawings are for the purpose of illustrations only and is not intended as a definition of the limits of the invention.

BRIEF DESCRIPTION OF THE DRAWINGS

A more complete appreciation of the present invention and many of the attendant advantages thereof will be readily obtained as the same becomes better understood by reference to the following description when considered in connection with the accompanying drawings, wherein.

DETAILED DESCRIPTION OF THE PREFERRED EMBODIMENTS

Figure 1:
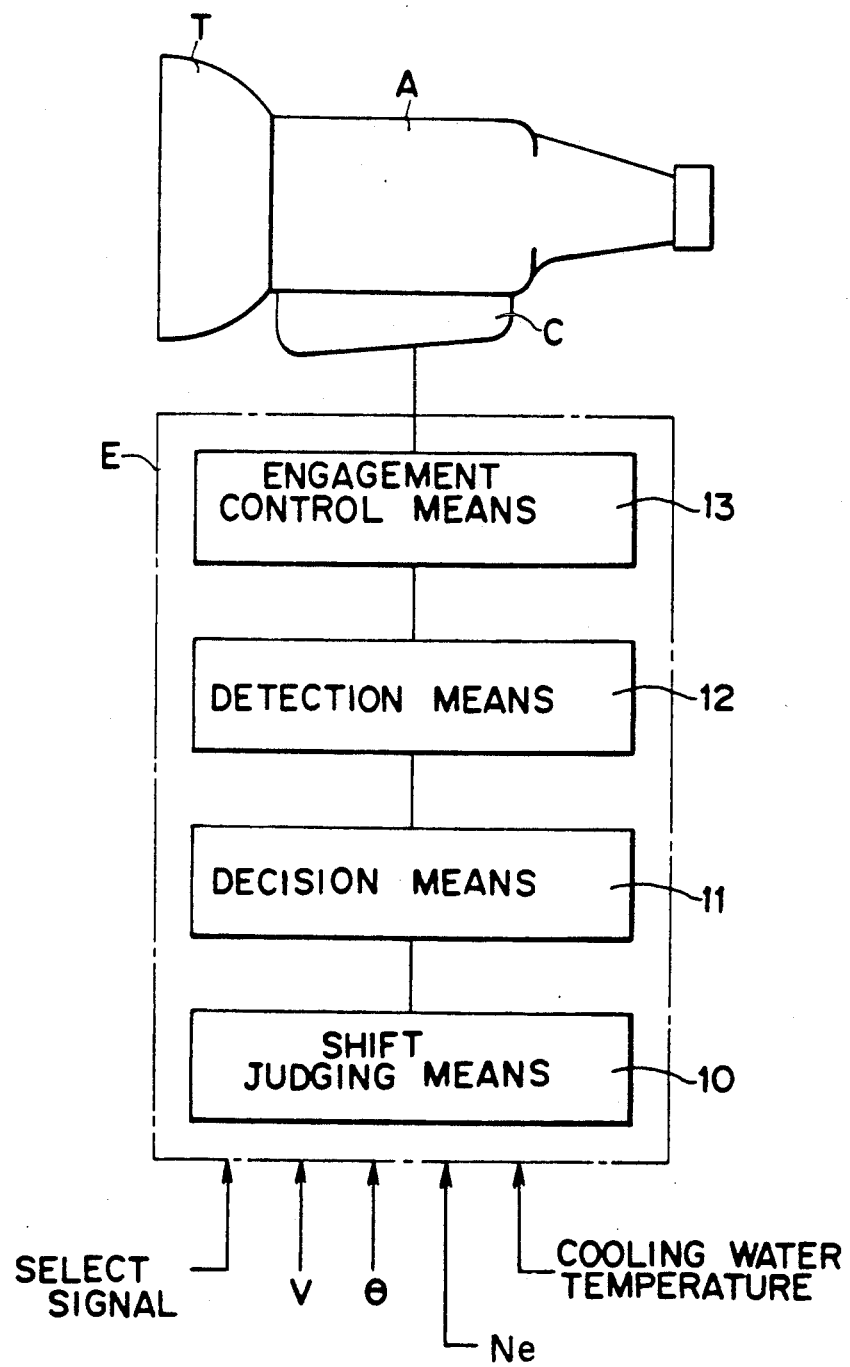
FIG. 1 is a block diagram showing the fundamental components of the present invention.

In FIG. 1, an automatic transmission A is connected through a torque converter T to an engine (although not shown) and is equipped with a gear train and frictional engagement means, as will be described hereinafter. Moreover, the automatic transmission A is set to a plurality of gear stages by engaging or releasing the frictional engagement means with oil pressures fed from hydraulic control apparatus C.

This hydraulic control apparatus C is equipped with a plurality of solenoid valves (although not shown), for example, which are to be turned ON or OFF in response to a signal outputted from a control unit E. This control unit E is constructed mainly of a microcomputer, which is fed with control data such as a vehicle speed V, a throttle opening $\theta$, the rotational speed Ne of the engine, a running mode select signal or a cooling water temperature. The control unit E is also constructed to include shift judging means 10, decision means 11, detection means 12 and engagement control means 13.

The shift judging means 10 judges that a shift is to be executed, when a running state determined mainly by the vehicle speed V and the throttle opening $\theta$ exceeds a predetermined shift point. On the other hand, the decision means 11 decides whether or not there is one of the planetary gear sets composing the gear train, which takes no part in the torque transmission at a gear stage to be set thereto by executing the shift. The reason why there is a planetary gear set taking no part in the torque transmission is that the gear train in the automatic transmission A is composed of three planetary gear sets, as will be described hereinafter. The detection means 12 detects the rotational speed of the rotary components of the planetary gear set which takes no part in the torque transmission. Moreover, the engagement control means controls the engaged state of a predetermined one of the frictional engagement means, especially the oil pressure to be fed to the frictional engagement means on the basis of the rotational speed detected by the detection means 12, to damp the revolution fluctuations of the rotary components.

The system of the present invention will be described in the following in connection with its specified embodiment.

Figure 2:
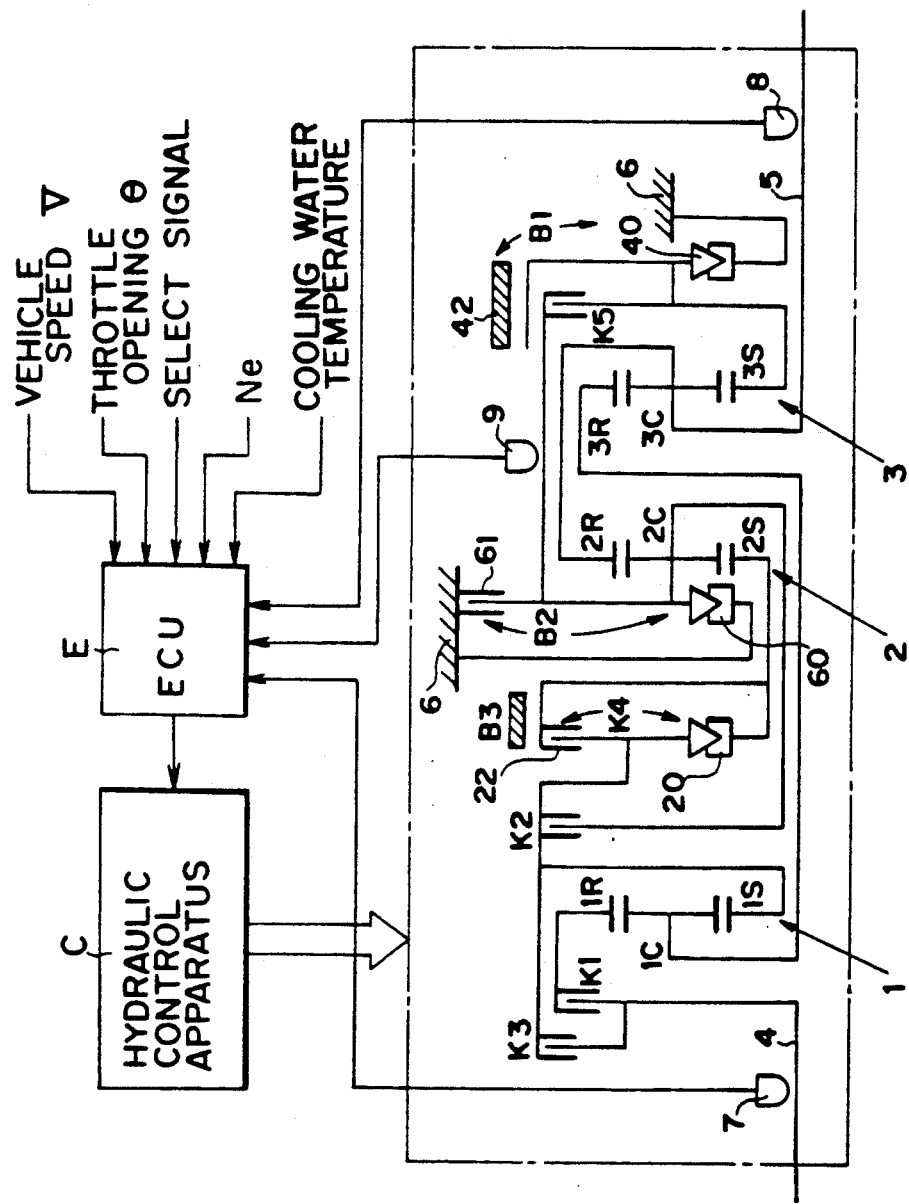
FIG. 2 is a block diagram showing one embodiment of the present invention.
Figure 6:
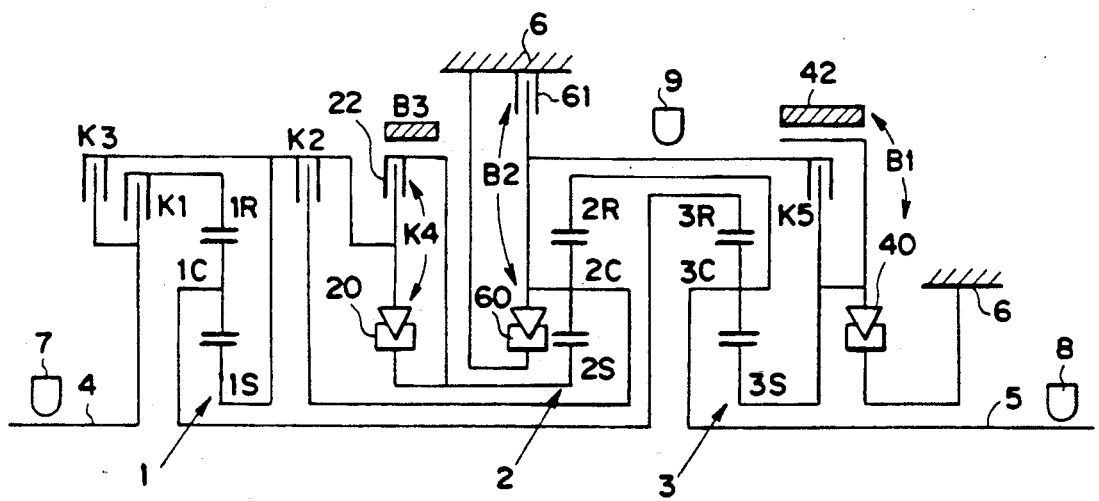
FIG. 6 is a skeleton diagram showing one example of the gear train for use in the automatic transmission which has already been applied for patent by us.

FIG. 2 is a schematic diagram showing one embodiment of the present invention. This embodiment has a gear train similar to that of the structure shown in FIG. 6, and the description of its gear train will be omitted by designating the components at reference characters similar to those of FIG. 6. Moreover, the gear stages to be set by the structure shown in FIG. 2 and the engagement/release patterns for setting the gear stages are like those enumerated in Table 1.

In the automatic transmission shown in FIG. 2, too, the setting of each gear stage is executed by engaging the clutch means and the brake means designated by the circle ◯ in Table 1. For this operation, there are provided as the control means: the hydraulic control apparatus C for feeding and discharging the oil pressures to engage/release the individual ones of the clutch means and the brake means; and the electronic control unit (ECU) E for outputting an electric instruction signal to the hydraulic control apparatus C on the basis of the input data such as the vehicle speed V, the throttle opening $\theta$, the rotational speed of the engine, the shift position, the running mode select signal and the oil temperature. There are further provided: a rotational speed sensor 7 for detecting the rotational speed (or r.p.m.) $N_4$ of the input shaft 4 of the gear train; a rotational speed sensor 8 for detecting the rotational speed $N_5$ of the output shaft 5; and a rotational speed sensor 9 for detecting the rotational speed $N_{2c}$ of the carrier 2C of the secondary planetary gear set 2. These sensors 7, 8 and 9 are electrically connected with the aforementioned electronic control unit E. Moreover, the control system including the electronic control unit E and the hydraulic control apparatus C is constructed to execute not only the controls for setting a gear stage by using the engine load represented by the throttle opening $\theta$ and the vehicle speed V as its parameters but also the controls of the frictional engagement means for controlling the rotational speed of the rotary components of the planetary gear set, which takes no part in the power transmission at a predetermined gear stage, namely, the rotational speed of the sun gear 2S of the second planetary gear set 2.

These operations will be described in the following in connection with the controls of the shift from the 2nd to 3rd speeds. The 2nd speed is set according to the pattern of column b, as has been described with reference to Table 1. This setting will be exemplified in the form of a clutch and brake application chart including the one-way clutch in Table 2. Table 2 presents the engagement/release patterns of columns b and c of the 3rd speed, too. In Table 2, symbols ⓒ indicate that the corresponding components are applied at the time of an engine braking, and symbols Δ indicate that the corresponding components are engaged but take no part in the power transmission. The remaining symbols are similar to those of Table 1.

TABLE 2

|     |   | Clutch Means |    |    |    |    |    | Brake Means |    |    |    |
|-----|---|----|----|----|----|----|----|----|----|----|----|
|     |   |    |    |    | K4 |    |    | B1 |    | B2 |    |
|     |   | K1 | K2 | K3 | 22 | 20 | K5 | 42 | 40 | 60 | 61 | B3 |
| 2nd | b | ○  |    |    | ⓒ  | ○  |    | ○  | ○  |    |    | ○  |
| 3rd | b | ○  |    | ○  |    |    |    | ⓒ  | ○  |    |    | Δ  |
|     | c | ○  |    | ○  | ○  | Δ  |    | ⓒ  | ○  |    |    |    |

The 2nd speed is set, as enumerated in Table 2, by engaging the first clutch means K1, the one-way clutch 20 of the fourth clutch means K4, the one-way clutch 40 and the band brake 42 of the first brake means B1, and the third brake means B3. On the other hand, the engine braking is established by engaging the multiple disc clutch 22 of the fourth clutch means K4 and is released except immediately before the shift by disengaging at least one of that multiple disc clutch 22 and the band brake 42 of the first brake means B1. In this state, as has been described hereinbefore with reference to FIG. 6, the individual planetary gear sets take part in the power transmission so that their rotary components perform the constrained motions. If, in this state, the shift to the 3rd speed is judged in terms of an increase in the vehicle speed, the one-way clutch 20 of the fourth clutch means K4 is released as the third clutch means K3 is engaged, in case the 3rd speed is to be set according to the pattern of column b. In case, on the other hand, the 3rd speed is to be set according to the pattern of column c, the third brake means B3 is additionally released, but the multiple disc clutch 22 of the fourth clutch means K4 is engaged.

Figure 3:
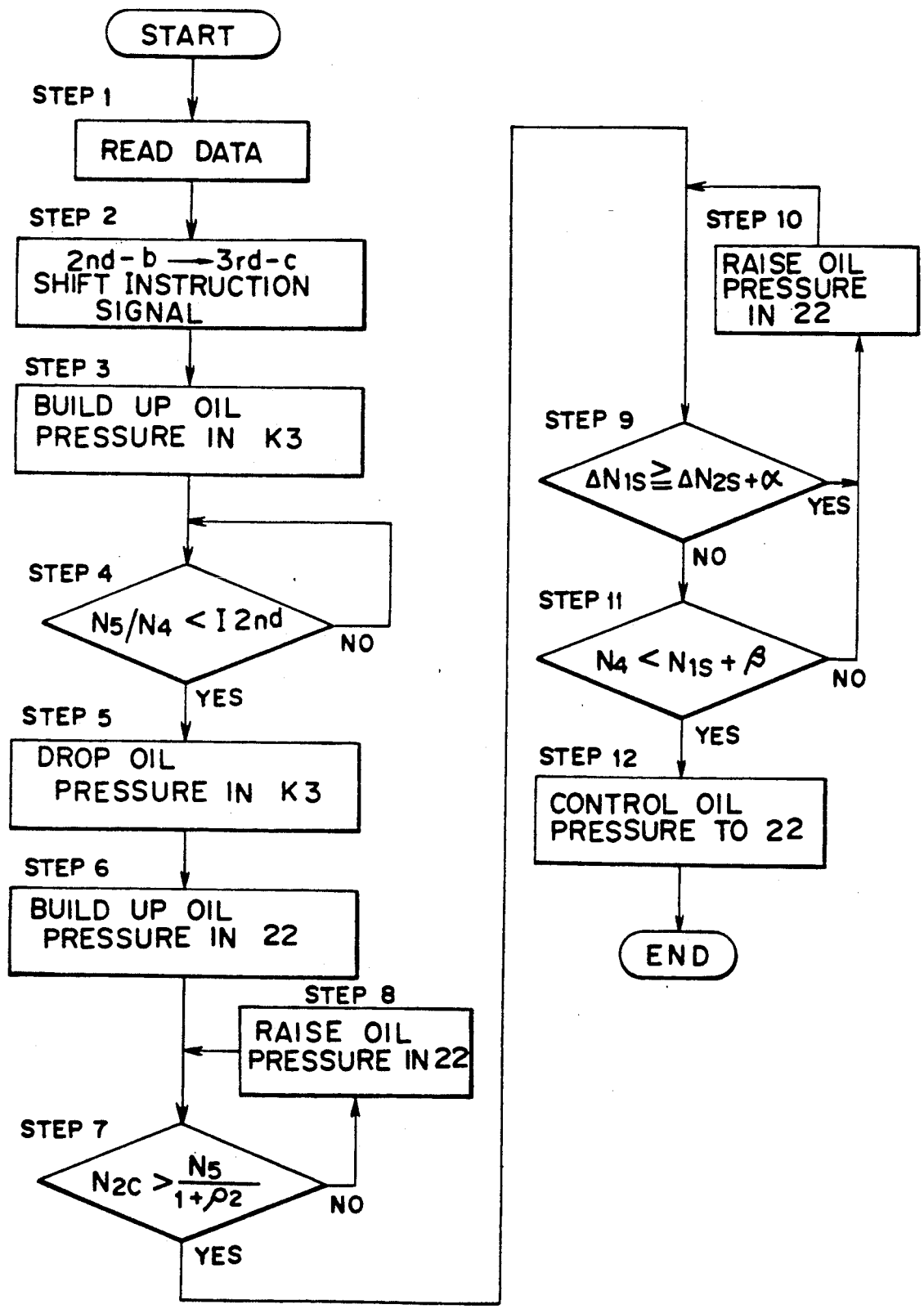
FIG. 3 is a flow chart showing the control routine of the same.

The control of the shift by changing the 2nd-b pattern to the 3rd-c pattern is exemplified in the form of a flow chart in FIG. 3. First of all, the various data are read in (at Step 1). If a signal is resultantly outputted (at Step 2) to instruct the shift according to the change from the 2nd-b pattern to the 3rd-c pattern, the oil pressure for engaging the third clutch means K3 is built up (at Step 3). As the third clutch means K3 gradually transmits the torque, the ratio ($N_5/N_4$) of the rotational speed $N_5$ of the output shaft to the rotational speed $N_4$ of the input shaft is accordingly varied. The oil pressure is continuously fed to the third clutch means K3 till the ratio goes below a predetermined value $I_{2nd}$ (e.g., the gear ratio of the 2nd speed), that is to say, till the judgment result of Step 4 is "YES". At the instant when the judgment result of Step 4 is "YES", the fourth clutch means K4 has its one-way clutch 20 released. Although the third brake means B3 is still engaged, the entirety of the second planetary gear set 2 stops participating in the power transmission so that no torque is transmitted for setting the gear stage. This state is intermediate between the 2nd and 3rd speeds, and the oil pressure is dropped (at Step 5) for releasing the third brake means B3 so as to shift the intermediate state to the pattern of the column c for the 3rd speed. Moreover, the oil pressure is built up (at Step 6) for engaging the multiple disc clutch 22 of the fourth clutch means K4. The rotational speeds $N_{2S}$ and $N_{2C}$ of the sun gear 2S and the carrier 2C of the second planetary gear set 2 in the transient state, in which the third brake means B3 is released but the fourth clutch means K4 is engaged, can be expressed by the following formula:

$$N_{2S} = \{(1+\rho_2)N_{2C} - N_5\}/\rho_2,$$

wherein $\rho_2$: the gear ratio of the second planetary gear set 2.

As can be understood from this formula, the rotational speeds of the sun gear 2S and the carrier 2C of the second planetary gear set 2 can be neither obtained nor controlled from the rotational speed $N_5$ of the output shaft 5 only. In the automatic transmission shown in FIG. 2, therefore, the oil pressure in the fourth clutch means K4 is controlled on the basis of the output signal of the aforementioned sensor 9, i.e., the detected result $N_{2C}$ of the rotational speed of the carrier 2C. Specifically, the value of $N_5/(1+\rho_2)$ and the rotational speed $N_{2C}$ of the carrier 2C are compared (at Step 7). If the former is smaller than the latter, that is, if the judgment result of Step 7 is "NO", the oil pressure in the multiple disc clutch 22 of the fourth clutch means K4 is raised (at Step 8). If the result is "YES", on the other hand, the routine advances to Step 9, at which it is judged whether or not the fluctuating rotational speed $\Delta N_{1S}$ of the sun gear 1S of the first planetary gear set 1 is larger by a predetermined value $\alpha$ (e.g., a preset constant value or a value varying with the throttle opening or the vehicle speed) than the fluctuating rotational speed $\Delta N_{2S}$ of the sun gear 2S of the second planetary gear set 2. If the judgment result is "YES", the oil pressure in the multiple disc clutch 22 of the fourth clutch means K4 is raised (at Step 10). If the result is "NO", the routine advances to Step 11. At Step 11, it is judged whether or not the rotational speed $N_4$ of the input shaft 4 is smaller than the sum of the rotational speed $N_{1S}$ of the sun gear 1S of the first planetary gear set 1 and a predetermined value $\beta$ (e.g., a preset constant value or a value varying with the throttle opening or the vehicle speed). If the judgment result is "NO", the control of Step 10 is continued. If the result is "YES", the pressure to the multiple disc clutch 22 of the fourth clutch means K4 is controlled (at Step 12). Since, at the 3rd speed, the entirety of the first planetary gear set 1 is rotated together with the input shaft 4, as has been described hereinbefore, the instant immediately before the end of the shift to the 3rd speed is detected at Step 11. From that instant, the oil pressure to the multiple disc clutch 22 is so finely adjusted that the rotational speed of the sun gear 2S and the carrier 2C of the second planetary gear set 2 may be gradually equalized to a mechanically predetermined value. As a result, the revolutions of the carrier 2C and the sun gear 2S of the second planetary gear set 2 taking no part in the power transmission is stabilized to cause no abrupt rotational fluctuation so that the inertia is reduced to prevent the shocks.

Then, the controls shown in FIG. 3 are ended when the rotational speeds of the sun gear 1S of the first planetary gear set 1 and the sun gear 2S of the second planetary gear set 2 become equal to that of the input shaft 4.

Incidentally, in the automatic transmission having the structure shown in FIG. 2, controls can be made not only to damp the aforementioned rotational fluctuations of the rotary components of the second planetary gear set 2 but also to prevent the sun gear 2S of the second planetary gear set 2 from rotating backward and to make the rate of change proper.

In case of the aforementioned shift from the 2nd to 3rd speeds, on the other hand, it is necessary to change the third clutch means K3 from the released state to the engaged state. For this necessity, therefore, the oil pressure of the third clutch means K3 may be controlled by feeding back the rotational speed of such a component, e.g., the sun gear 1S of the first planetary gear set 1 or the sun gear 2S of the second planetary gear set 2 as will have its rotations fluctuating in accordance with the change of the third clutch means K3.

Incidentally, the present invention can be applied to the automatic transmission equipped with a gear train, in which any one of the planetary gear sets takes no part in the power transmission at a predetermined gear stage. Therefore, the present invention can also be applied to an automatic transmission which is exemplified by adding fourth brake means (although not shown) for holding the sun gear 1S of the first planetary gear set 1 only to the structure shown in FIG. 2. Alternatively, the present invention can be applied to an automatic transmission equipped with a gear train which is exemplified by connecting the ring gear 2R of the second planetary gear set 2 to not the carrier 3C but the ring gear 3R of the third planetary gear set 3, as shown in skeleton diagram in FIG. 4.

Figure 5:
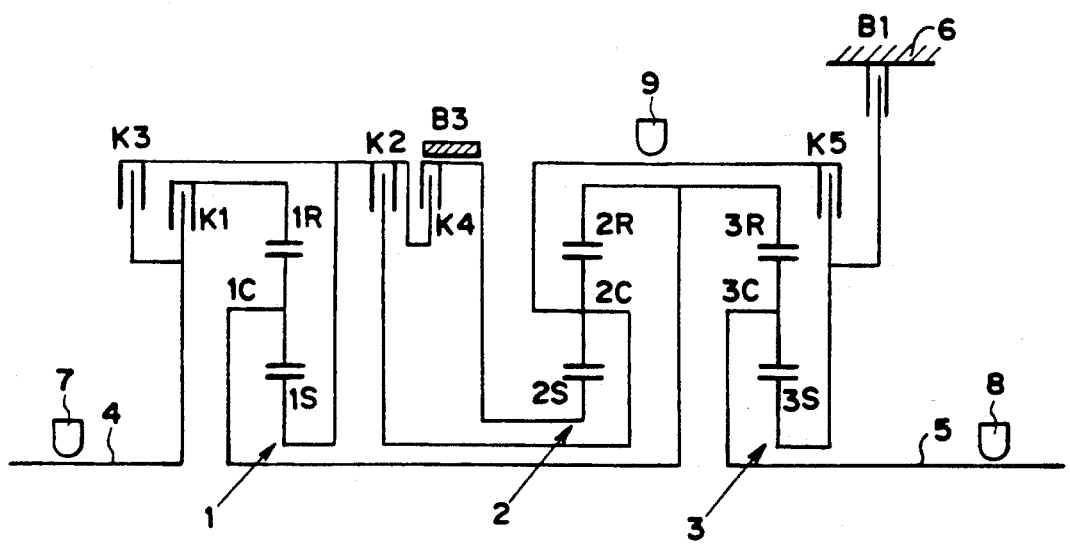
FIG. 5 is a skeleton diagram showing still another gear train for use in an automatic transmission, to which the present invention is to be applied.

Still another example of the gear train, to which the present invention can be applied, is shown in FIG. 5.

Figure 4:
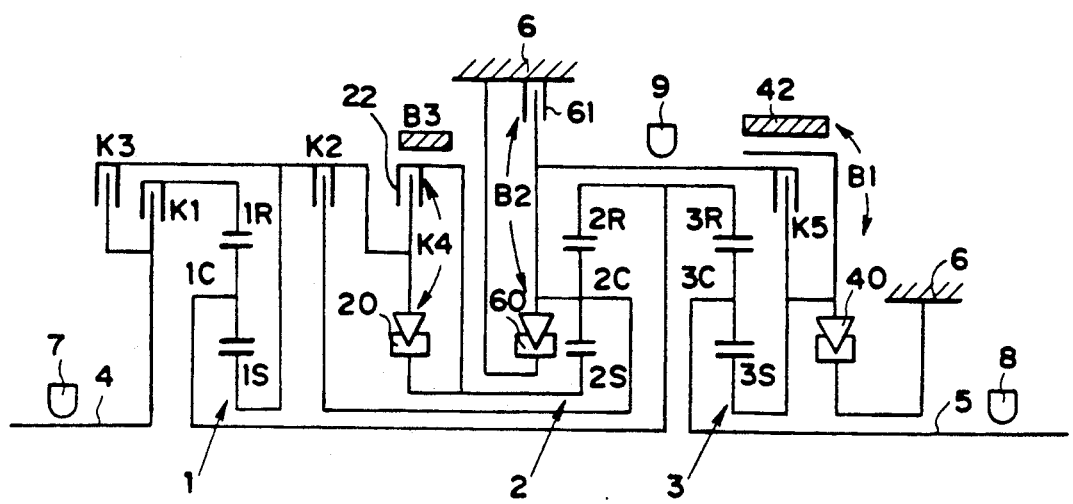
FIG. 4 is a skeleton diagram showing another gear train for use in an automatic transmission, to which the present invention is to be applied.

The example shown in FIG. 5 is made identical to the structure shown in FIG. 4, excepting that the fourth clutch means K4 is composed of a single multiple disc clutch, that the first brake means B1 is composed of a single multiple disc clutch, and that the second brake means B2 is omitted.

The automatic transmission equipped with the gear train shown in FIG. 5 can also set all the gear stages that can be set by the automatic transmission having the gear train of FIG. 4.

Furthermore, the present invention can be applied to the automatic transmission which has the structures, as disclosed in the specifications and drawings of our Japanese Patent Applications Nos. Hei 1-185151, Hei 1-158152, Hei 1-186996, Hei 1-186992, Hei 1-205478 and Hei 1-280957. In any of these structures, it is sufficient to provide means for detecting the rotational speed of any of the rotary components of the planetary gear set taking no part in the power transmission at the predetermined gear stage, and control means for controlling the frictional engagement means such as the clutch means on the basis of the detection result of the former means.

In the automatic transmission of the present invention, as is now apparent from the description thus far made, the planetary gear set, if any, which takes no part in the power transmission at the predetermined gear stage, can be prevented from coming into the unconstrained chain by detecting the rotational speed of the rotary components of that planetary gear set to control the clutch means, but the rotational speed is positively controlled. As a result, it is possible to prevent the abrupt fluctuations of revolution, which might otherwise accompany the shift. Thus, according to the present invention, the reduction of the shifting shocks can be controlled highly accurately to improve the riding comfortableness of the vehicle better.

What is claimed is:

1. A shift control system for an automatic transmission comprising: a gear train including a plurality of planetary gear sets having rotary components, an input shaft and an output shaft; a plurality of clutch means for selectively connecting either the rotary components of said planetary gear sets with each other or said rotary components and said input shaft; and a plurality of brake means for holding said rotary components selectively in immovable states, any one of said planetary gear sets being adapted to take no part in the transmission of torque at one gear stage, wherein the improvement comprises:

detection means for detecting the rotational speed of the rotary components of the planetary gear set which takes no part in the torque transmission at said gear stage; and engagement control means for controlling the engaged states of said clutch means or said brake means on the basis of the detection result by said detection means so that the revolving states of the rotary components of the planetary gear set taking no part in the torque transmission are controlled.

2. A shift control system according to claim 1, further comprising:

shift judging means for judging that a shift is to be executed; and decision means for deciding whether or not there is a planetary gear set which takes no part in the torque transmission at a gear stage to be set thereto as a result of executing the shift.

3. A shift control system according to claim 1, wherein said clutch means and said brake means are adapted to be controlled with oil pressures fed thereto, further comprising hydraulic control means for controlling the oil pressures to be fed to said clutch means and said brake means.

4. A shift control system according to claim 3, wherein said engagement control means is adapted to output a signal to said hydraulic control means to control the oil pressure to be fed to any of said clutch means or said brake means.

5. A shift control system according to claim 1, wherein said engagement control means is adapted to control said clutch means or said brake means by comparing the change in the rotational speed detected by said detection means and a predetermined first reference value.

6. A shift control system according to claim 5, wherein said first reference value is one varying on the basis of the vehicle speed and the throttle opening.

7. A shift control system according to claim 1, wherein said engagement control means is adapted to control said clutch means or said brake means by comparing the rotational speed detected by said detection means and a predetermined second reference value.

8. A shift control system according to claim 7, wherein said reference value is one varying on the basis of the vehicle speed and the throttle opening.

9. A shift control system according to claim 1, wherein said gear train comprises:

a first planetary gear set including a first sun gear, a first ring gear, a pinion gear meshing with said first sun gear and said first ring gear, and a first carrier supporting said pinion gear;

a second planetary gear set including a second sun gear selectively connected to said first sun gear, a second ring gear, a pinion gear meshing with said sun ring gear and said ring gear, and a second carrier supporting said pinion gear; and a third planetary gear set including a third sun gear selectively connected to said second carrier, a third ring gear connected integrally or selectively to said first carrier, a pinion gear meshing with said third sun gear and said third ring gear, and a third carrier supporting said pinion gear and connected integrally or selectively to said second ring gear.

10. A shift control system according to claim 9, wherein said detection means includes a sensor for detecting the rotational speed of said second carrier, a sensor for detecting the rotational speed of said input shaft, and a sensor for detecting the rotational speed of said output shaft.

11. A shift control system according to claim 10, wherein said clutch means includes:
a first clutch for connecting said input shaft and said ring gear selectively;
a second clutch for connecting said first sun gear and said second carrier selectively;
a third clutch for connecting said input shaft and said first sun gear selectively;
a fourth clutch for connecting said first sun gear and said second sun gear selectively; and
a fifth clutch for connecting said second carrier and said third sun gear selectively,
wherein said brake means includes:
a first brake for stopping the revolution of said second carrier selectively; and
a second brake for stopping the revolution of said second sun gear selectively, and
wherein said output shaft is connected to said third carrier.

12. A shift control system according to claim 11, wherein said fourth clutch has a one-way clutch and a multi-disc clutch having a parallel relation to each other,
wherein said first brake has a one-way clutch and a multi-disc brake having a parallel relation to each other, and
wherein said second brake is a band brake.

13. A shift control system according to claim 1, wherein said gear train comprises:
a first planetary gear set including a first sun gear, a first ring gear, a pinion gear meshing with said first sun gear and said first ring gear, and a first carrier supporting said pinion gear;
a second planetary gear set including a second sun gear connected integrally or selectively to said first sun gear, a second ring gear connected integrally or selectively to said first carrier; a pinion gear meshing with said second sun gear and said second ring gear, and a second carrier supporting said pinion gear; and
a third planetary gear set including a third sun gear connected integrally or selectively to said second carrier, a third ring gear connected integrally or selectively to said second ring gear, a pinion gear meshing with said third sun gear and said third ring gear, and a third carrier supporting said pinion gear.

14. A shift control system according to claim 13, wherein said detection means includes a sensor for detecting the rotational speed of said second carrier, a sensor for detecting the rotational speed of said input shaft, and a sensor for detecting the rotational speed of said output shaft.

15. A shift control system according to claim 14, wherein said clutch means includes:
a first clutch for connecting said input shaft and said first ring gear selectively;
a second clutch for connecting said first sun gear and said second carrier selectively;
a third clutch for connecting said input shaft and said first sun gear selectively;
a fourth clutch for connecting said first sun gear and said second sun gear selectively; and
a fifth clutch for connecting said second carrier and said third sun gear selectively,
wherein said brake means includes:
a second brake for stopping the revolution of said second sun gear selectively; and
a third brake for stopping the revolution of said third sun gear selectively, and
wherein said output shaft is connected to said third carrier.

16. A shift control method for an automatic transmission, comprising: a gear train including a plurality of planetary gear sets having rotary components, an input shaft and an output shaft; a plurality of clutch means for selectively connecting either the rotary components of said planetary gear sets with each other or said rotary components and said input shaft; and a plurality of brake means for holding said rotary components selectively in immovable states, any one of said planetary gear sets being adapted to take no part in the transmission of torque at one gear stage, comprising:
a step of controlling the engaged states of said clutch means or said brake means so that the revolving states of the rotary components of the planetary gear set which take no part in the torque transmission are controlled.

17. A shift control method according to claim 16, further comprising:
another step of deciding that a shift should be executed to any of said gear stages; and
still another step of detecting the rotational speed of the rotary components of the planetary gear set which takes no part in the transmission of torque at said one gear stage,
whereby the engaged states of said clutch means or said brake means are controlled on the basis of the detection result of said still another step.

18. A shift control method according to claim 16, wherein said third step changes the transmission torque capacity of said clutch means or said brake means by controlling the oil pressures to be fed to said clutch means or said brake means, on the basis of said detection result.

* * * * *